United States Patent
Lawn et al.

(10) Patent No.: US 11,863,413 B1
(45) Date of Patent: Jan. 2, 2024

(54) NETWORK SERVICE GENERICISED METRICS

(71) Applicant: MICROSOFT TECHNOLOGY LICENSING, LLC, Redmond, WA (US)

(72) Inventors: Jonathan Marcus Lawn, Enfield (GB); Calum Sutherland Loudon, Edinburgh (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/889,377

(22) Filed: Aug. 16, 2022

(30) Foreign Application Priority Data

Jun. 16, 2022 (GB) ...................................... 2208904

(51) Int. Cl.
  *H04L 43/065* (2022.01)
  *H04L 41/5054* (2022.01)
  *H04L 43/0817* (2022.01)

(52) U.S. Cl.
  CPC ........ *H04L 43/065* (2013.01); *H04L 41/5054* (2013.01); *H04L 43/0817* (2013.01)

(58) Field of Classification Search
  CPC ............... H04L 43/065; H04L 41/5054; H04L 43/0817
  See application file for complete search history.

(56) References Cited

U.S. PATENT DOCUMENTS

| 10,922,024 | B1* | 2/2021 | Thomas ................ G06F 3/0619 |
| 2008/0250265 | A1* | 10/2008 | Chang ................. H04L 41/0663 |
| | | | 714/4.12 |
| 2012/0102423 | A1* | 4/2012 | Hollingsworth ......... G06N 5/02 |
| | | | 715/772 |
| 2019/0034315 | A1* | 1/2019 | Acosta .................... G06F 8/658 |
| 2019/0114245 | A1 | 4/2019 | Mermoud et al. |
| 2022/0407773 | A1* | 12/2022 | Kempanna .............. H04L 43/06 |

OTHER PUBLICATIONS

"Observability for Modern Application Platforms", In White Paper of Vmware, Sep. 16, 2020, pp. 1-28.
"International Search Report and Written Opinion Issued in PCT Application No. PCT/US23/019711", dated Aug. 1, 2023, 16 Pages.
Tzanettis, et al., "Data Fusion of Observability Signals for Assisting Orchestration of Distributed Applications", In Journal of Sensors, vol. 22, Issue 5, Mar. 7, 2022, pp. 1-21.

* cited by examiner

*Primary Examiner* — Anh Nguyen
(74) *Attorney, Agent, or Firm* — Newport IP, LLC; Han K. Gim (57) ABSTRACT

A system for orchestrating deployment of network services is described. The system comprises a plurality of network services, an observability framework and an orchestration agent. The observability framework receives monitoring data corresponding to at least one network function of a network service, identifies data corresponding to the status and/or performance of the network service, aggregates the identified data into genericized metrics for the network service and forwards the genericized metrics to the orchestration agent. The orchestration agent uses the genericized metrics to trigger actions.

18 Claims, 6 Drawing Sheets

NETWORK SERVICE GENERICISED METRICS

PRIORITY

This non-provisional utility application claims priority to GB patent application number 2208904.9 entitled "NETWORK SERVICE GENERICISED METRICS" and filed on Jun. 16, 2022, which is incorporated herein in its entirety by reference.

BACKGROUND

A network service is an application that provides a network operation often supporting many users and/or traffic flows concurrently. Network services (NSs) are provided by one or more servers often in a cloud-based and/or datacenter implementation. Examples of existing network services include domain name service (DNS), email, voice over interne protocol (VoIP) and video telephony, among many others. In recent times there has been development towards building bespoke NSs from simpler network function (NF) building blocks. Examples of NFs include routers, load balancers, border gateways, among many others that together can form an NS. This arrangement allows for simpler design, deployment, upgrading and testing of the NS. When designed in this way the NS may be comprised of one or more physical NFs, virtual NFs, cloud NFs or a combination.

Deploying and managing network services is a continuous task.

The embodiments described below are not limited to implementations which solve any or all of the disadvantages of known network service deployment and orchestration systems.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is a method using an observability framework and an orchestration agent. The method comprises using the observability framework, receiving monitoring data corresponding to at least one network function of a network service. Using the observability framework, data is identified about the network service in the monitoring data. Using the observability framework, the identified monitoring data is aggregated into the genericized metrics for the network service. Using the observability framework the genericized metrics are made available to an orchestration agent. The orchestration agent triggers an operation being any one or more of: an action on the network function from which the monitoring data was received, an action on the network service, an action on another network function, an action on another network service. The orchestration agent is configured to trigger the operation based on identifying at least one of the genericized metrics and an associated threshold.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

An orchestration agent is computer-implemented functionality for interoperating with an orchestrator for deploying services in the cloud or other communications network. A non-exhaustive list of examples of orchestrators is: Kubernetes (trade mark), Docker Swarm (trade mark), Azure (trade mark) container instances, Openshift (trade mark) container platform.

The term "observability framework" is used to refer to computer-implemented functionality for enabling an end user to view data about the state of services deployed in a communications network.

The term "genericized metric" is used to refer to a numeric or Boolean measurement value. The value is in a form understood by an orchestration agent and an observability framework and has a key that can be addressed. In a non-limiting example, a genericized metric is "packet loss". By using a numeric or Boolean value it is possible to efficiently compare a genericized metric with another genericized metric or with a numerical threshold (rather than having to encode an understanding of enumerated states for instance).

The automated deployment and lifecycle management of NSs and individual NFs is called automated orchestration. Deploying, upgrading or making other changes to the NFs is potentially hazardous to the operation of the NS they are a part of and/or to individual NFs within the NS. It is often impossible to predict the full impact of any change until it is deployed and in live operation. The inventors recognize that it is therefore crucial that such upgrades are rolled out incrementally often at a single NF and that the impact on the NS and/or individual NFs within the NS is accurately determined before further roll out. One approach is to use dedicated feedback systems to assess the impact of upgrading and deploying NFs. However, the inventors have recognized that using dedicated feedback systems requires extra connections, additional code and physical and/or virtual resources leading to inefficiencies.

As discussed above it is desirable to accurately appreciate the impact of a new deployment on status and performance of a network service and/or individual NFs within the NS. One approach attempts to provide this through a dedicated feedback system with additional connections and resources leading to inefficiency. In contrast to using a dedicated feedback system, the present technology takes an observability framework, which may be already available, and adapts it in order to improve efficiency whilst at the same time giving high quality feedback which is usable to control deployment of network services in an automated manner. An observability framework, which may have been originally designed only for use by human operators, is adapted for interoperation with an orchestration agent in an automated manner. In this way efficient, automated orchestration is achieved as now explained with reference to the drawings. In addition the observability framework is still usable by a human operator to view data.

Figure 1:
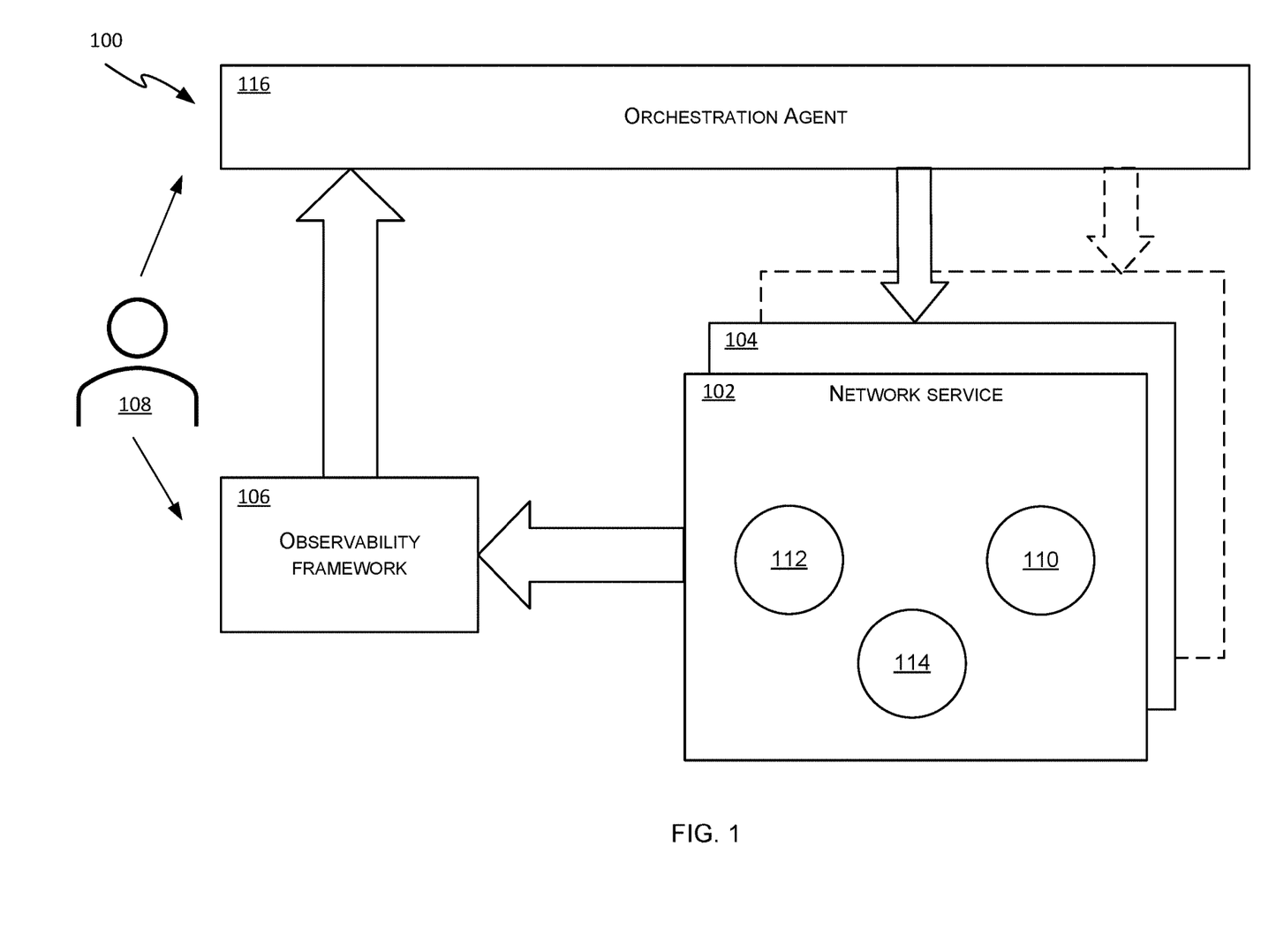
FIG. 1 is a schematic diagram illustrating a system for orchestrating deployment of network services.

FIG. 1 is a schematic diagram illustrating a system for orchestrating deployment of network services. A system 100 comprises a network service (NS) 102, other network services 104, an observability framework 106, an orchestration agent 116, and three network functions (NFs) 110, 112, 114. A human operator 108 is able to access observability framework in order to view data and is able to access orchestration agent 116. However, it is not essential for human operator 108 to be present as in some cases the technology is fully automated without the involvement of a human operator.

As described above NSs may comprise one or more NFs. In the example of system 100 the NS 102 comprises at least three NFs 110, 112, 114. The NS 102 is a VoIP telephony or video telephony service or any other type of network service. The NFs 110, 112, 114 are virtual NFs, physical NFs or cloud NFs. The NF 110 is a router, load balancer or any other type of NF.

As part of general observability requirements NFs report log streams of events along with status and performance metrics. These allow an operator to observe the specific status of the individual NFs. Each type of NF produces this monitoring data with formatting and content specific to that type. As NSs often comprise many different types of NFs, the monitoring data from a NS will contain varying content and formatting. In the system 100 this monitoring data from the NFs of the NS is used to decide on actions in the system. For example the actions maybe to make decisions about further deployment. For example when deciding to further deploy other NSs 104. This could be at other sites, or for different operators at a same site. This is more efficient than existing systems because it makes use of the monitoring data that is already produced by the NFs. However, as discussed the monitoring data is specific to NFs and not all of the monitoring data will be useful to determine the actions on further deployment. As part of the deployment the NFs 110, 112, 114 are sometimes upgraded and therefore lead to unpredictable effects on the behavior of the NS.

The NFs 110, 112, 114 forward monitoring data, which is log streams and/or metrics, to the observability framework 106. The log streams each comprise of a stream of events (such as chronological events) that have been logged at the NF/s. A non-exhaustive list of examples of the metrics in the monitoring data is any one or more of: packet loss, error rates, peak or mean response times, requests per second, jitter, thread count.

The observability framework allows an operator 108 to observe this monitoring data. The observability framework 106 aggregates the monitoring data into genericized metrics for the NS 102. The inventors have found that aggregating the monitoring data into genericized metrics for the NS allows the health of the NS as a whole to be determined, as well as that of the individual NFs. The genericized metrics comprise identified data from the monitoring data that identifies the status and/or performance of the NS 102 and therefore allows automated decisions to be made regarding further deployment. The identified data depends on the monitoring data received as different NFs will provide different log streams and/or metrics. The identified data also depends on the type of NS as different monitoring data will be more relevant for the decision to further deploy different types of NS. For example, in a cloud telephony NS the packet loss percentage may be a highly relevant metric. The aggregation of the monitoring data into genericized metrics by the observability framework 106 may occur as for the case where an observability framework provides data to a human operator 108 without integration with an orchestration agent. Details about the aggregation is described below.

The genericized metrics are made available by the observability framework 106 to the orchestration agent 116, and optionally to the operator of the NS 102. The orchestration agent 116 receives the genericized metrics and determines whether at least one portion of the genericized metrics meets at least one threshold. If it determines the portion of the genericized metrics does or does not meet this threshold an action is taken regarding the other network services 104. The action which is taken by the orchestration agent may be any one or more of: an action on the network function from which genericized metrics were obtained, an action on the network service from which genericized metrics were obtained, an action on another network function, an action on another network service.

Using the above example of packet loss percentage a threshold may be 2.5%. If the portion of the genericized metrics indicates the packet loss percentage is above that threshold the orchestration agent 116 takes the action of halting the deployment at the other NSs 104 in some examples. Other actions that may be taken include continuing the deployment process, modifying the deployment process or any other deployment action.

System 100 therefore provides a more efficient means for orchestrating deployment as it allows deployment actions to be determined based on metrics and logs that are already present and collected in an orchestration system but in a NF specific form which is then genericized. System 100 may be implemented as a cloud-based or datacenter system. The NF does not need to be modified to provide the metrics and/or logs. An observability framework may be available which provides data to a human operator 108 such as the metrics and logs. The observability framework may be adapted to provide that data to the orchestration agent 116.

Figure 2:
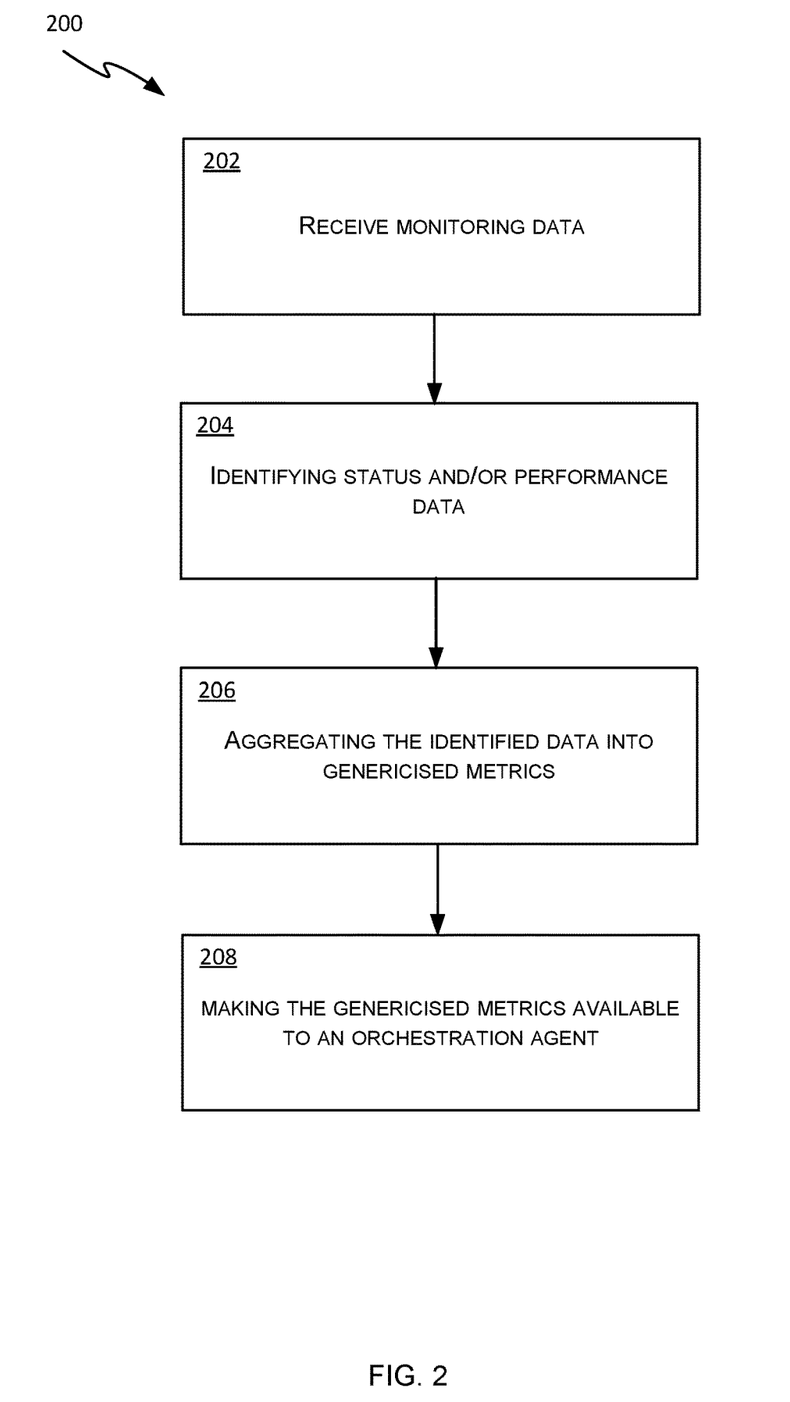
FIG. 2 is a flow diagram illustrating a method performed by an observability framework.

FIG. 2 is a flow diagram illustrating a method 200 for generating genericized metrics of a network service at an observability framework such as the observability framework of FIG. 1. Method 200 begins at operation 200 where the observability framework such as that described in system 100, receives monitoring data from one or more NFs of an NS. As discussed above this monitoring data comprises metrics and/or log streams from the one or more NFs and is specific in content and format to the type of NF that generated the monitoring data. The monitoring data is received out of chronological order or with varying priorities in some cases. For example an event log may be forwarded as soon as it is logged by the NF. This allows for rapid determination of new genericized metrics by the observability framework compared to other implementations without asynchronous receiving of monitoring data.

At operation 204, the observability framework identifies, from the monitoring data of the NFs, status and/or performance data for the NS. The observability framework receives different monitoring data depending on the type of NF/s that the NS is comprised of. As discussed above for different types of NS different metrics and events in log streams will be indicative of status and/or performance. Only monitoring data that is present from the NFs and relevant to the NS is therefore identified. The identification is performed by searching the monitoring data for target fields of metrics and events known to be relevant to the NS in some cases. The identification may be performed based on configuration rules. The identification is based on types of stored thresholds at the orchestration agent in some examples.

At operation 206 the identified data is then aggregated into genericized metrics. The aggregation combines the identified monitoring data and filters out other monitoring data that was not deemed relevant to the status and/or performance of the NF or NS in operation 204. The genericized metrics therefore comprise a combination of events from log streams and metrics from the NFs in some examples. Unlike the NF specific logs and metrics the genericized metrics have a generic format that can be read by the orchestration agent without modification. The genericized metric may comprise at least one field corresponding to a type of the identified monitoring data e.g. a packet loss percentage field.

At operation 208 the genericized metric is made available to an orchestration agent for use in instructing an orchestrator of the network service.

Figure 3:
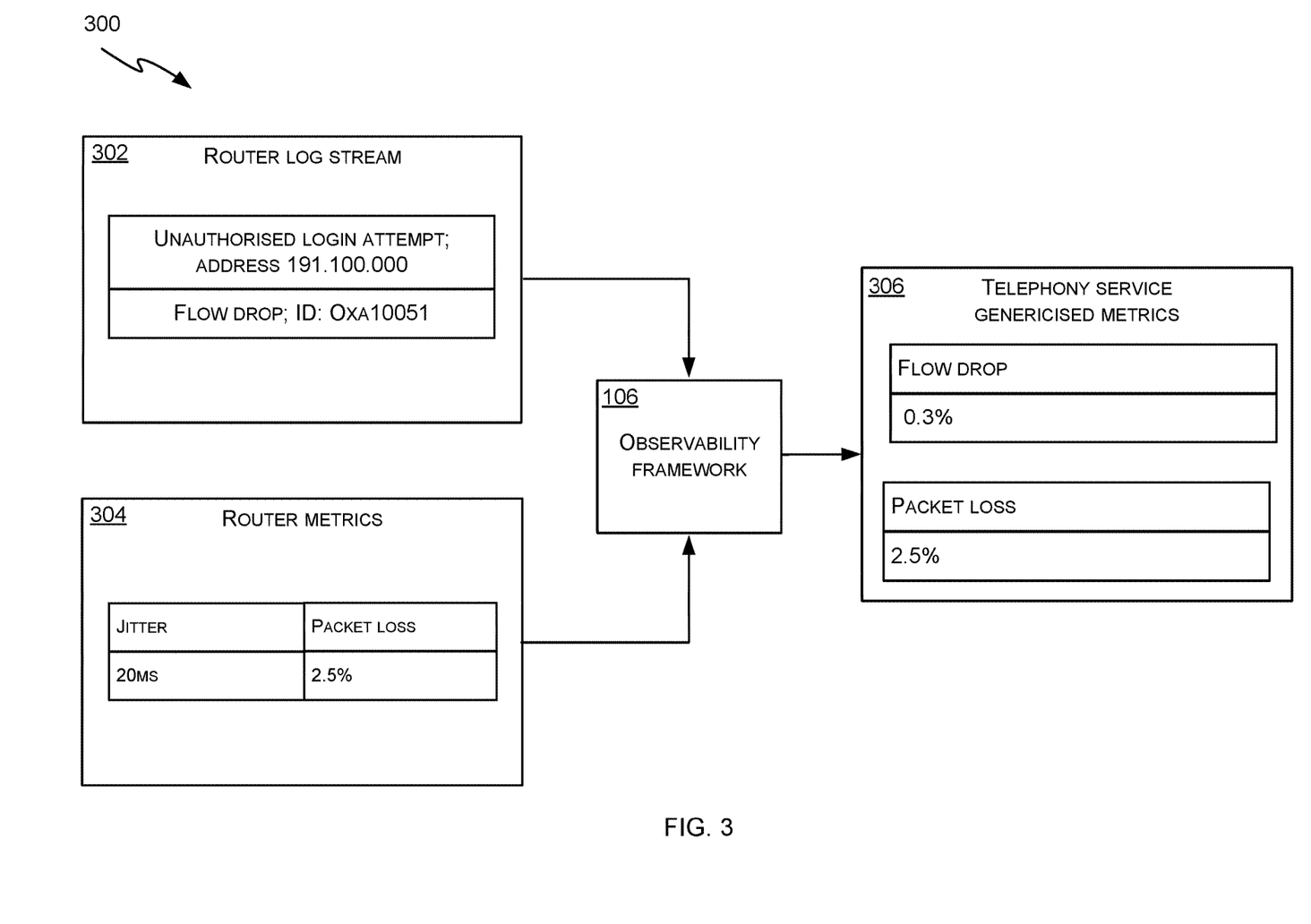
FIG. 3 is a schematic diagram illustrating the generation of genericized metrics.

FIG. 3 is a schematic diagram 300 illustrating a simplified example of the generation of genericized metrics for an example network service. Diagram 300 comprises a router log stream 302 and router metrics 304 forwarded to an observability framework 106. Telephony service genericized metrics 306 are also forwarded from the observability framework 106.

In the example of diagram 300, the NS is a telephony service and the NF is a router. It will be readily understood that the techniques in this disclosure can be applied to many other types of NS and NF and that there may be more than one NF and more than one type of NF. The type of NF and NS partially determine which monitoring data will be included in the genericized metrics from the observability framework 106 in some cases.

As described above the monitoring data from the NFs is often specific to the type of NF. In the example of diagram 300, the router NF forwards two types of monitoring data, the router log stream 302 and the router metrics 304. The router log stream 302 comprises two entries an unauthorized login attempt event and a flow dropped event. The router metrics 304 comprise two metrics: jitter and packet loss. The events and metrics are presented in such a way for ease of explanation and in reality are forwarded in a different format.

At the observability framework 106 the monitoring data comprising the router log stream 302 and router metrics 304 is received. The observability framework 106 then identifies the monitoring data that indicates the status and/or performance of the network service, in this example a telephony service. Of the two entries in the router log stream 302 the observability framework 106 identifies the events that indicate the status and/or performance. This may be none or one or more of the events in the router log stream 302. The same identification is performed on the router metrics 304. In the example of diagram 300, the observability framework 106 identifies that the flow drop percentage and the packet loss metric of the router NF indicate the status and/or performance of the telephony NS.

Once identified the observability framework 106 aggregates the identified monitoring data into the telephony service genericized metrics 306. This includes both the identified event from the router log stream 302 and the identified metric from the router metrics 304. As part of an observability process for orchestration, the observability framework 106 also provides the monitoring data to an operator of the network service, optionally including the genericized metrics. The extra functionality for the observability framework 106 therefore provides genericized metrics 306 for a network service using NF specific metrics and logs already being collected without requiring a dedicated system to collect the NS metrics.

The observability framework 106 is observing a cloud based system and receives feedback from many NFs and NSs across multiple sites. The processing for the observability framework 106 is therefore distributed across multiple networked servers in some cases for scalability.

Figure 4:
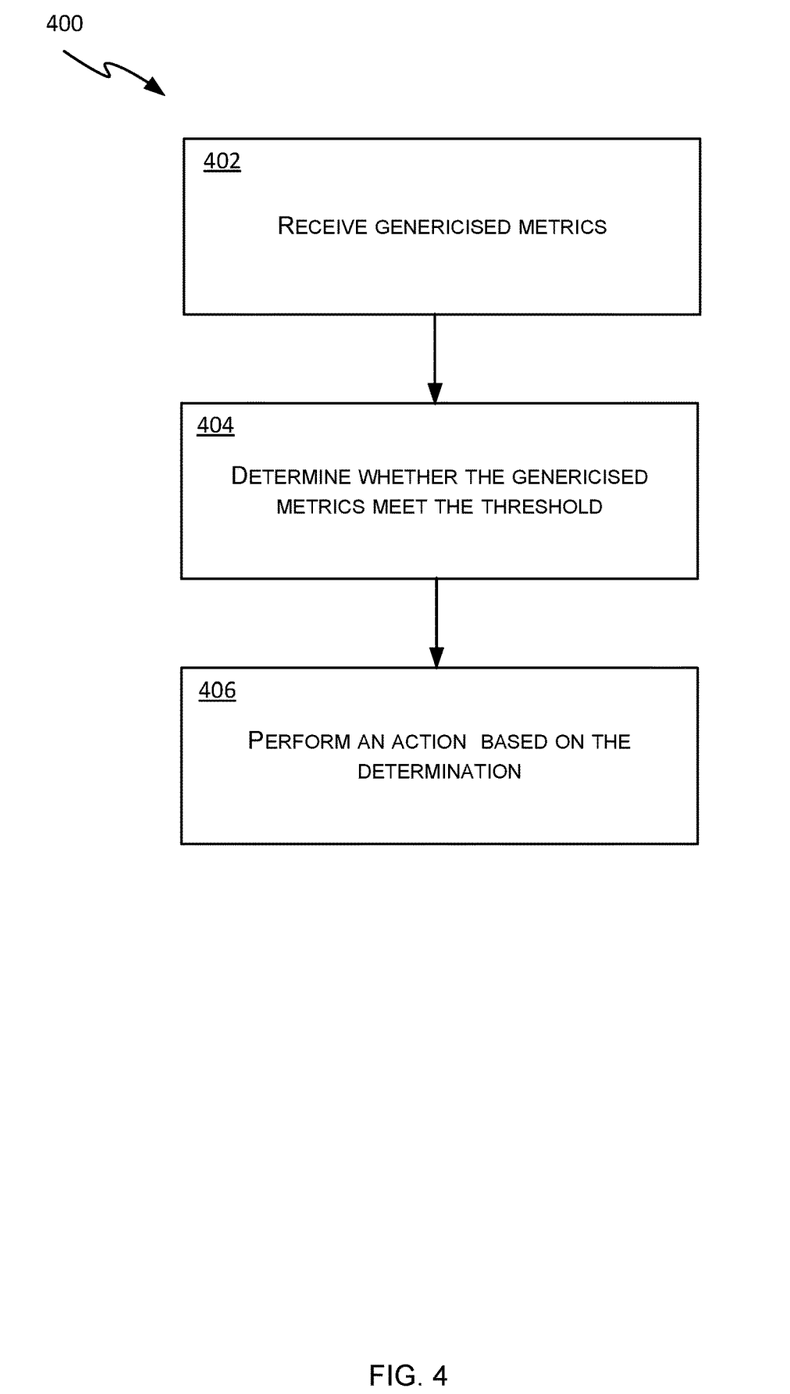
FIG. 4 is a flow diagram illustrating a method performed by an orchestration agent.

FIG. 4 is a flow diagram illustrating a method for performing orchestration actions at an orchestration agent based on genericized metrics of an NS. The method may be carried out by one or more processors from instructions stored in memory.

At operation 402 the orchestration agent receives the genericized metrics for the NS. As discussed above the genericized metrics are generated from logs and metrics of the NFs in the NS that indicate the status and/or performance of the NS. The genericized metrics may contain one or more fields corresponding to different types of monitoring data.

At operation 404 the orchestration agent determines whether one or more portions of the genericized metrics has met at least one threshold. The orchestration agent determines whether a value of the portion is above or below the threshold. The orchestration agent applies the threshold to the portion of the genericized metric corresponding to one or more fields in the genericized metrics. In some examples, the orchestration agent at operation 404 uses logical combinations of one or more thresholds, or arithmetic combinations of thresholds.

At operation 406 the orchestration agent applies an action on one or more other network services based on the result of the determination of operation 404. When the value at the portion meets or exceeds the threshold it indicates the deployment caused a status and/or performance degradation that is not acceptable in some cases. The NS deployment is therefore not safe to roll out to other NSs and any factor that makes this NS different from other NSs is not replicated to them. In such cases the orchestration agent takes action to halt the deployment process at the other NSs. In cases where the threshold is not met it indicates the deployment of the NS is not working correctly and is therefore not safe to roll out to the other NSs. Another possible action is to automatically modify the deployment based on the determination. Another possible action is for deployment to delete the NS and then re-attempt creating it; or when modifying the NS to attempt to roll-back to a previous good configuration.

The operation at 406 occurs at the NF level in some cases, such as when gradually updating an NS one NF at a time.

In summary the actions which are possible at operation 406 are: any one or more of: an action on the network function from which genericized metrics were obtained, an action on the network service from which genericized metrics were obtained, an action on another network function, an action on another network service.

Figure 5:
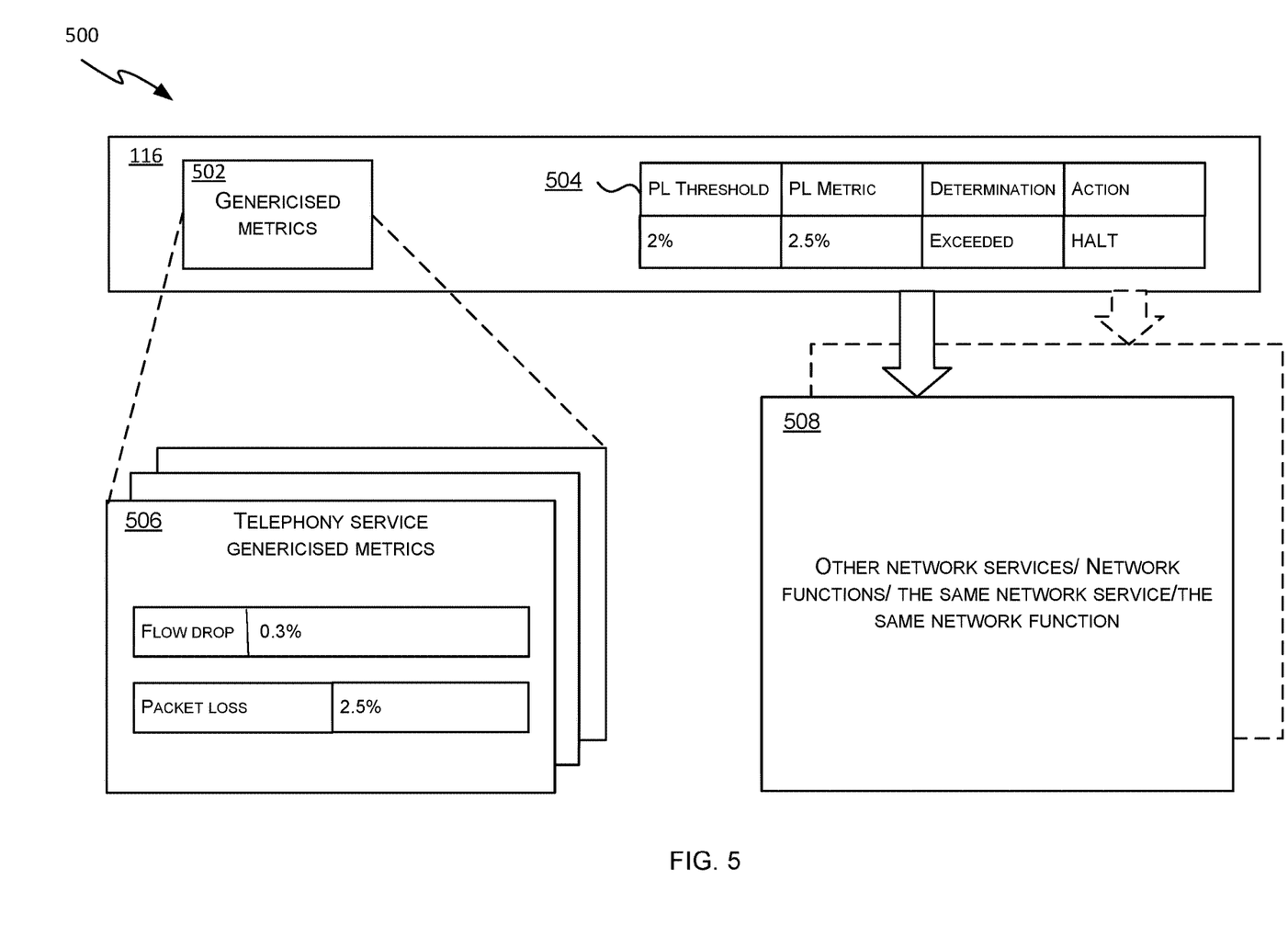
FIG. 5 is a schematic diagram illustrating an action determined by an orchestration agent.

FIG. 5 is a schematic diagram illustrating an example of an orchestration agent 116 taking orchestration actions. Diagram 500 comprises telephony service genericized metrics 506, and orchestration agent 116 which includes the received genericized metrics 502 and table 504. Also shown in FIG. 5 is the entity or entities 508 to which the orchestration agent applies an action. These are any one or more of: a network function from which genericized metrics were obtained, a network service from which genericized metrics were obtained, another network function, another network service.

In the example of diagram 500 the same telephony service genericized metrics 506 generated in diagram 300 are received by the orchestration agent 116. The orchestration agent is able to receive and store genericized metrics 502 from one or more network services. The network services are often across one or more different sites. It is the task of the orchestration agent 116 to safely deploy network services. To determine whether a network service deployment is operating safely they are rolled out incrementally for example, at one NS at one site at a time this is sometimes referred to as "canarying". When the NS deployment is deemed to be safe it is rolled out to one or more other NSs 104 instantiated at the same site or at remote sites. The other NSs 104 may be a same NS as the NS and the deployment may be an upgrade applied first to the NS.

The orchestration agent uses the genericized metrics to automatically determine the safety of the NS site and take actions at the other NSs. In the example of diagram 500 the telephony service genericized metrics include the metric packet loss. The orchestration agent has a stored packet loss threshold shown in the table 504. The thresholds are entered manually by an operator in some cases. Alternatively, the thresholds are set automatically based on historical data or qualify of service QoS parameters.

The orchestration agent makes a determination of whether the value of the packet loss metric portion in the telephony service genericized metrics meets and exceeds the packet loss threshold value in table 504. In the example of diagram 500 the packet loss metric has a value of 2.5% compared to the threshold value of 2%. The determination made by the orchestration agent 116 is therefore that the NS has exceeded the threshold for packet loss.

Having determined the NS has exceeded the threshold the orchestration agent 116 then performs an action based on the determination. In the example of diagram 500 the action is to halt the deployment to the one or more NSs 104. The choice of action may be based on the result of more than one threshold determination from the genericized metrics 502. The choice of action in response to the determination is performed using combinational logic. Alternatively a trained machine learning model is used to select an appropriate output from the one or more threshold determinations. The action performed by the orchestration agent is any one or more of: an action on the network function from which genericized metrics were obtained, an action on the network service from which genericized metrics were obtained, an action on another network function, an action on another network service.

The orchestration agent 116 is often orchestrating a cloud based system and responsible for network services at many sites. The processing performed for the orchestration agent 116 is therefore distributed across multiple networked servers as mentioned above.

The orchestration agent improves the functioning of network service deployment by using genericized metrics from the observability framework in an automated manner.

Figure 6:
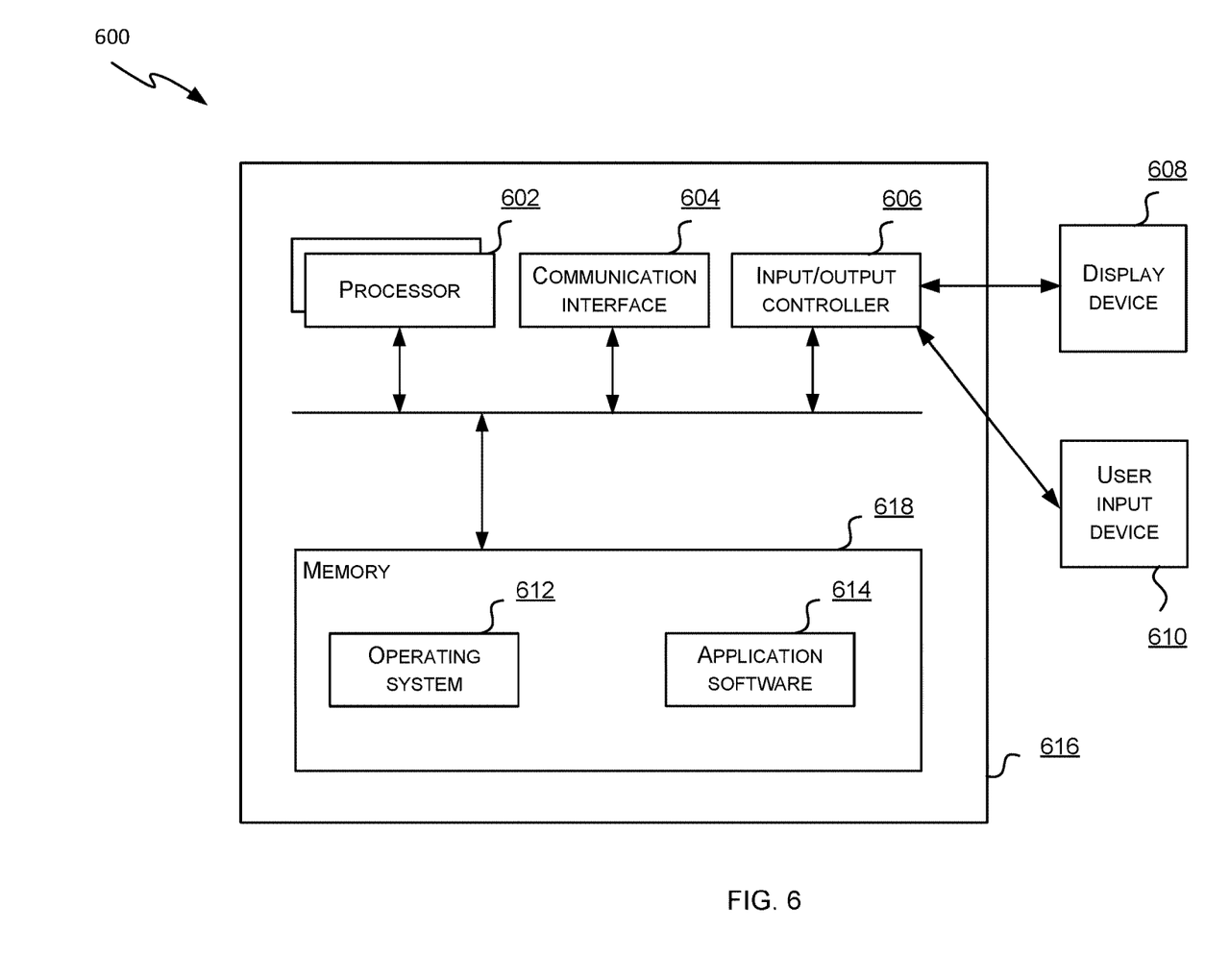
FIG. 6 illustrates an exemplary computing-based device in which embodiments of the system, observability framework and/or orchestration agent are implemented.

FIG. 6 illustrates various components of an exemplary computing-based device 600 which are implemented as any form of a computing and/or electronic device, and in which any of the above embodiments are implemented in some examples. In some cases the computing-based device 600 is used to implement an orchestration agent. In some cases the computing-based device 600 is used to implement an observability framework. In some cases the computing-based device 600 implements both an observability framework and an orchestration agent.

Computing-based device 600 comprises one or more processors 602 which are microprocessors, controllers or any other suitable type of processors for processing computer executable instructions to control the operation of the device to implement the examples described above. Platform software comprising an operating system 612 or any other suitable platform software is provided at the computing-based device to enable application software 614 to be executed on the device.

The computer executable instructions are provided using any computer-readable media that is accessible by computing based device 600. Computer-readable media includes, for example, computer storage media such as memory 618 and communications media. Computer storage media, such as memory 618, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium is not to be interpreted to be a propagating signal per se. Although the computer storage media (memory 618) is shown within the computing-based device 600 it will be appreciated that the storage is, in some examples, distributed or located remotely and accessed via a network or other communication link (e.g. using communication interface 604).

The computing-based device 600 also comprises an input/output controller 606 arranged to output display information to a display device 608 which may be separate from or integral to the computing-based device 600. The display information may provide a graphical user interface. The input/output controller 606 is also arranged to receive and process input from one or more devices, such as a user input device 610 (e.g. a mouse, keyboard, camera, microphone or other sensor). In some examples the user input device 610 detects voice input, user gestures or other user actions and provides a natural user interface (NUI). This user input may be used to set threshold values in the orchestration agent. In an embodiment the display device 608 also acts as the user input device 610 if it is a touch sensitive display device. The input/output controller 606 outputs data to devices other than the display device in some examples, e.g. a locally connected printing device (not shown in FIG. 6).

Alternatively or in addition to the other examples described herein, examples include any combination of the following clauses:

Clause A. A method comprising:
using an observability framework, receiving monitoring data corresponding to at least one network function of a network service;
using the observability framework, identifying data about the network service in the monitoring data;
using the observability framework, aggregating the identified monitoring data into the genericized metrics for the network service; and
using the observability framework, making the genericized metrics available to an orchestration agent;
using the orchestration agent to trigger an operation being any one or more of: an action on the network function from which the monitoring data was received, an action on the network service, an action on another network function, an action on another network service;
wherein the orchestration agent is configured to trigger the operation based on identifying at least one of the genericized metrics and an associated threshold.

Clause B. The method according to clause A wherein at least one of the network functions of the network service has been deployed.

Clause C. The method of claims clause A or B wherein the monitoring data comprises metrics of the network function.

Clause D. The method according to clause A or B wherein the monitoring data comprises log streams of the network function.

Clause E. The method according to clause A or B wherein the content and format of the monitoring data is specific to the network function.

Clause F. The method according to any preceding clause wherein the monitoring data is received from the at least one network function.

Clause G. The method according to clause A or B wherein the genericized metric comprises at least one field corresponding to a type of the identified monitoring data.

Clause H. The method according to clause A or B wherein identifying the data about the network service is based at least partially on a type of the network service.

Clause I. The method according to clause C wherein the metrics of the network function comprise at least one of packet loss, error rates, peak or mean response times, requests per second, and thread count.

Clause J. The method according to clause D wherein the log streams comprise a stream of events generated at the network function.

Clause K. A system comprising:
an observability framework configured to:
receive monitoring data corresponding to at least one network function of a network service;
identifying data about the network service in the monitoring data;
aggregate the identified monitoring data into the genericized metrics for the network service; and
make the genericized metrics available to an orchestration agent;
an orchestration agent configured to trigger an operation being any one or more of: an action on the network function from which the monitoring data was received, an action on the network service, an action on another network function, an action on another network service;
wherein the orchestration agent is configured to trigger the operation based on identifying at least one of the genericized metrics and an associated threshold.

Clause L. The system of clause K wherein the observability framework is an observability framework for providing data to a human operator and is adapted for automatic interoperation with the orchestration agent.

Clause M. The system of clause K or L wherein the observability framework and the orchestration agent both have a protocol of the genericized metrics.

Clause N. An orchestration agent for safely deploying network services comprising:
at least one processor; and
at least one memory storing instructions which when run by the processor cause the processor to:
receive genericized metrics for a network service from an observability framework;
determine whether one or more values of one or more portions of the genericized metrics has met at least one threshold; and
perform an action on at least one network service or network function based at least in part on the determination.

Clause O. The orchestration agent of clause N wherein the received genericized metrics comprise at least one field corresponding to a type of the identified monitoring data; and
the at least one portion is at least partially based on data corresponding to the at least one field.

Clause P. The orchestration agent according to clause N or O wherein the at least one other network service is instantiated in a remote site to the network service.

Clause Q. The orchestration agent according to any of clause N to P wherein the at least one other network service is a same network service instantiated in the remote site to the network service.

Clause R. The orchestration agent according to any of clause N to Q wherein the action is to continue a deployment process of the at least one other network service.

Clause S. The orchestration agent according to any of clause N to Q wherein the action is to halt a deployment process of the at least one other network service.

Clause T. The orchestration agent according to any of clause N to Q wherein the action is to modify a deployment process of the at least one other network service.

A method for deploying a network service implemented by a plurality of network functions in a communications network, the method comprising:
receiving monitoring data corresponding to at least one network function of the network service;
identifying, in the monitoring data, data pertaining to the network service;
aggregating the data pertaining to the network service into genericized metrics for the network service, the genericized metrics comprising numeric or Boolean measurement values;
sending the genericized metrics to an orchestration agent configured to interoperate with an orchestrator operable to deploy the network service in the communications network; and triggering, by the orchestration agent, an operation comprising one or more of: an action on the network function from which the monitoring data was received, an action on the network service, an action on another network function, or an action on another network service; wherein the operation is triggered based on at least one of the genericized metrics for the network service and an associated threshold.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A method for deploying a network service implemented by a plurality of network functions in a communications network, the method comprising:
   receiving, by an observability framework, monitoring data corresponding to at least one network function of the network service;
   identifying, by the observability framework in the monitoring data, data pertaining to the network service, wherein the monitoring data comprises formatting and content specific to the at least one network function of the network service;
   aggregating, by the observability framework, the data pertaining to the network service into genericized metrics for the network service that are independent of the formatting and content specific to the at least one network function of the network service, the genericized metrics comprising numeric or Boolean measurement values and at least one field corresponding to a type of the identified monitoring data;
   sending, by the observability framework, the genericized metrics to an orchestration agent configured to interoperate with an orchestrator operable to deploy the network service in the communications network, wherein values for the genericized metrics are usable by the orchestration agent and the observability framework without modification; and
   triggering, by the orchestration agent, an operation comprising one or more of: an action on the network function from which the monitoring data was received, an action on the network service, an action on another network function, or an action on another network service; wherein the operation is triggered based on at least one of the genericized metrics for the network service and an associated threshold.

2. The method according to claim 1, wherein at least one of the network functions of the network service has been deployed.

3. The method of claim 1, wherein the monitoring data comprises metrics of the network function.

4. The method according to claim 1, wherein the monitoring data comprises log streams of the network function.

5. The method according to claim 1, wherein the monitoring data is received from the at least one network function.

6. The method according to claim 1, wherein identifying the data pertaining to the network service is based at least partially on a type of the network service.

7. The method according to claim 3, wherein the metrics of the network function comprise at least one of packet loss, error rates, peak or mean response times, requests per second, and thread count.

8. The method according to claim 4, wherein the log streams comprise a stream of events generated at the network function.

9. A system comprising:
at least one processor;
a memory storing instructions that, when executed by the at least one processor, causes the system to perform operations comprising:
receiving monitoring data corresponding to at least one network function of a network service implemented by a plurality of network functions in a communications network;
identifying, in the monitoring data, data pertaining to the network service, wherein the data comprises formatting and content specific to each type of the plurality of network functions in the communications network;
aggregating the data pertaining to the network service into genericized metrics for the network service that are independent of the formatting and content specific to each type of the plurality of network functions, the genericized metrics comprising numeric or Boolean measurement values and at least one field corresponding to a type of the identified monitoring data;
sending the genericized metrics to an orchestration agent configured to interoperate with an orchestrator operable to deploy the network service in the communications network, wherein values for the genericized metrics are usable by the orchestration agent without modification; and
triggering, by the orchestration agent, an operation comprising one or more of: an action on the network function from which the monitoring data was received, an action on the network service, an action on another network function, or an action on another network service; wherein the operation is triggered based on at least one of the genericized metrics for the network service and an associated threshold.

10. The system of claim 9, wherein the operations are implemented as an observability framework for providing data to an operator and adapted for automatic interoperation with the orchestration agent.

11. The system of claim 10, wherein the observability framework and the orchestration agent have a protocol of the genericized metrics.

12. A non-transitory computer-readable storage medium having computer-executable instructions stored thereupon which, when executed by one or more processors of a computing device, cause the computing device to:
receive monitoring data corresponding to at least one network function of a network service implemented by a plurality of network functions in a communications network;
identify, in the monitoring data, data pertaining to the network service, wherein the data comprises formatting and content specific to each type of the plurality of network functions in the communications network;
aggregate the data pertaining to the network service into genericized metrics for the network service that are independent of the formatting and content specific to each type of the plurality of network functions, the genericized metrics comprising numeric or Boolean measurement values and at least one field corresponding to a type of the identified monitoring data;
send the genericized metrics to an orchestration agent configured to interoperate with an orchestrator operable to deploy the network service in the communications network, wherein values for the genericized metrics are usable by the orchestration agent without modification; and
trigger, by the orchestration agent, an operation comprising one or more of: an action on the network function from which the monitoring data was received, an action on the network service, an action on another network function, or an action on another network service; wherein the operation is triggered based on at least one of the genericized metrics for the network service and an associated threshold.

13. The non-transitory computer-readable storage medium of claim 12, wherein:
the genericized metrics is at least partially based on data corresponding to the at least one field.

14. The non-transitory computer-readable storage medium according to claim 12, wherein at least one other network service is instantiated in a remote site to the network service.

15. The non-transitory computer-readable storage medium according to claim 14, wherein the at least one other network service is a same network service instantiated in the remote site to the network service.

16. The non-transitory computer-readable storage medium according to claim 14, wherein the action is to continue a deployment process of the at least one other network service.

17. The non-transitory computer-readable storage medium according to claim 14, wherein the action is to halt a deployment process of the at least one other network service.

18. The non-transitory computer-readable storage medium according to claim 14, wherein the action is to modify a deployment process of the at least one other network service.

* * * * *